United States Patent [19]
White

[11] Patent Number: 4,583,629
[45] Date of Patent: Apr. 22, 1986

[54] AIR OPERATED PRESS GUARD

[76] Inventor: William P. White, c/o Mechanical Applications, Inc., Wiscasset, Me. 04578

[21] Appl. No.: 582,827

[22] Filed: Feb. 23, 1984

[51] Int. Cl.⁴ .............................................. F16P 3/16
[52] U.S. Cl. ................................... 192/130; 192/134; 100/53
[58] Field of Search .................. 192/130, 131 R, 133, 192/134, 137; 72/1, 2, 444; 74/612, 615; 100/53

[56] References Cited

U.S. PATENT DOCUMENTS

| | | | |
|---|---|---|---|
| 3,554,067 | 1/1971 | Scutella | 192/134 X |
| 3,939,314 | 2/1976 | Loeser | 192/134 X |
| 4,044,445 | 8/1977 | Douri | 192/134 X |
| 4,395,641 | 7/1983 | Dise | 192/134 X |
| 4,527,684 | 7/1985 | Eggeman et al. | 192/130 |

Primary Examiner—W. R. Wolfe
Attorney, Agent, or Firm—C. Yardley Chittick

[57] ABSTRACT

A safety device for use with machines in which the operator must use his hand or hands to position a work piece in the vicinity of a subsequently descending potentially dangerous element. The mechanism includes a downwardly movable probe which if intercepted by the operator's hand will prevent the machine element from operating. Removal of the hand to a safe position enables the probe to fall and the machine operation to proceed. The mechanisms are controlled by air actuated valves which automatically direct compressed air sequentially to the operative elements.

7 Claims, 10 Drawing Figures

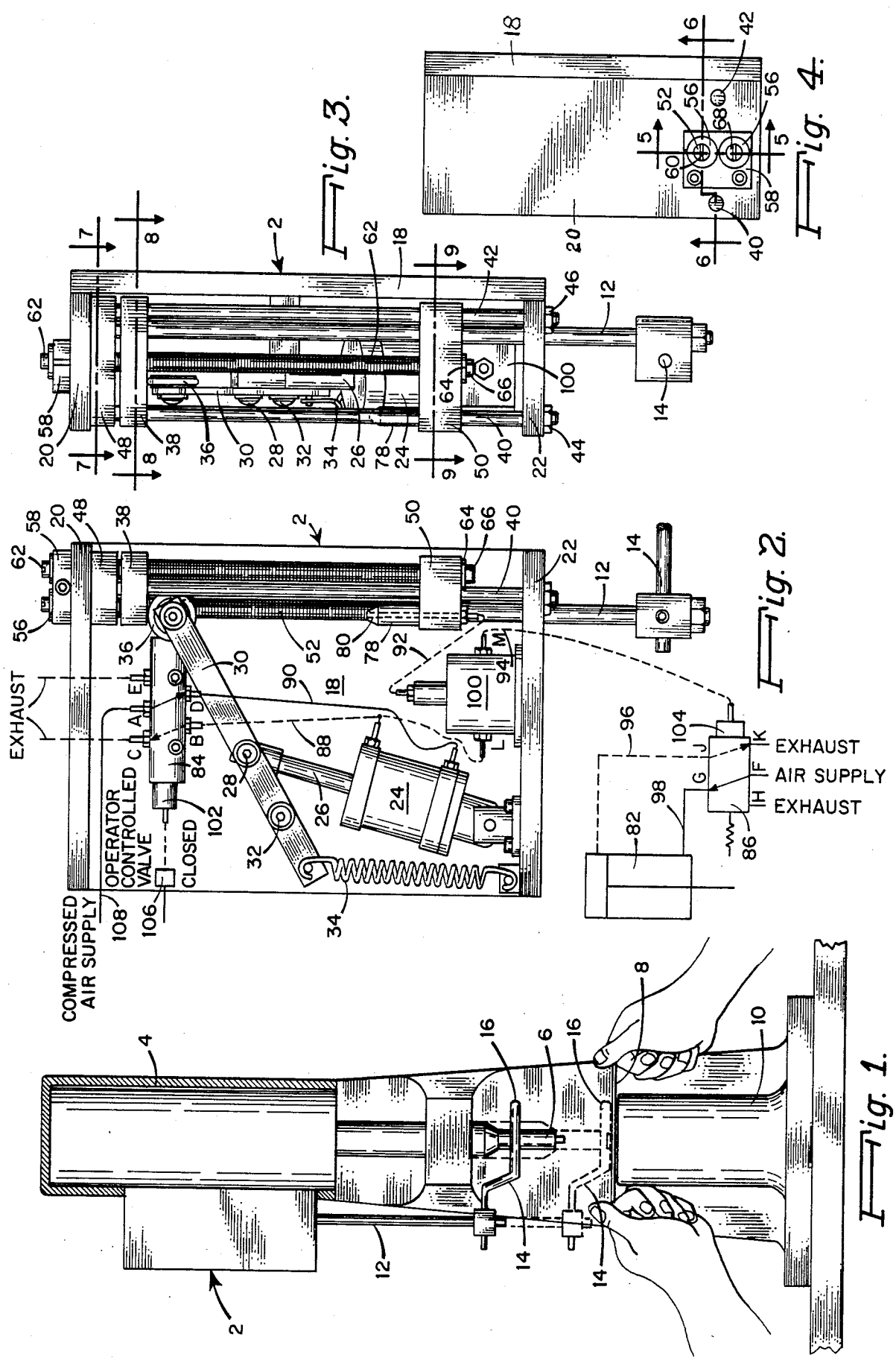

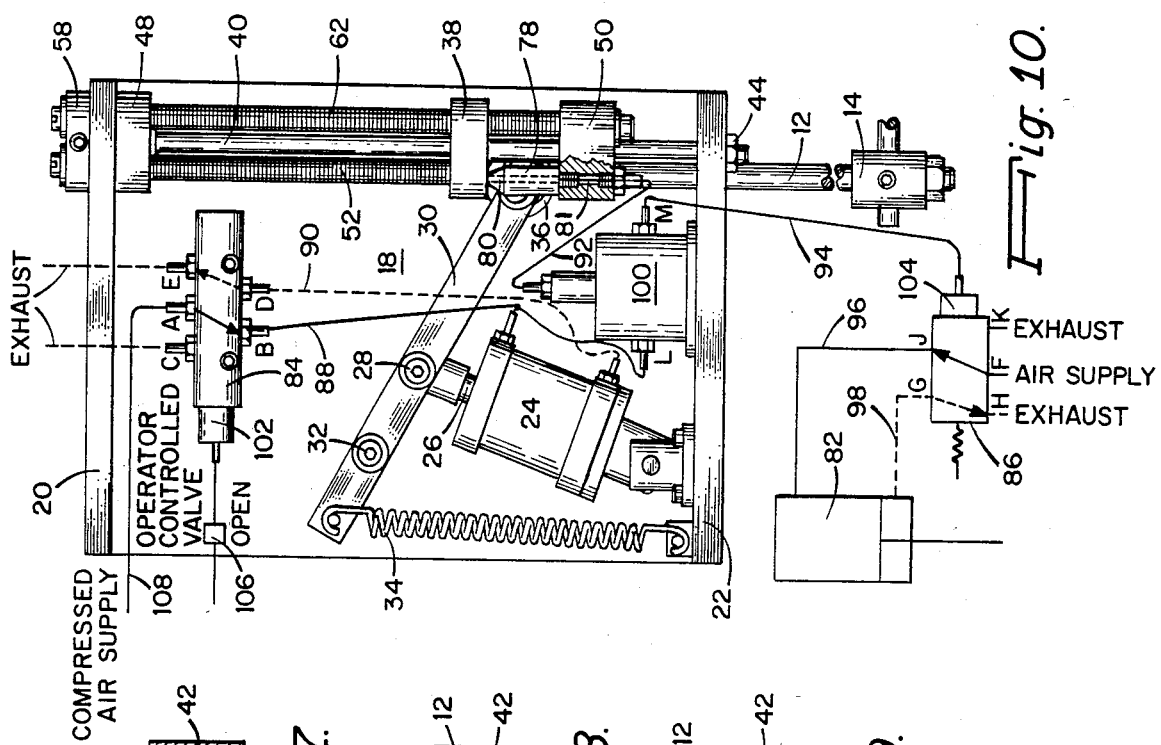
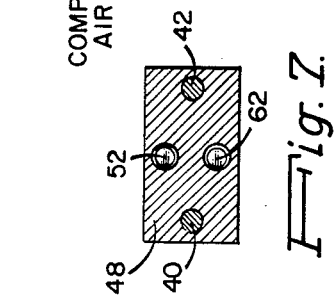
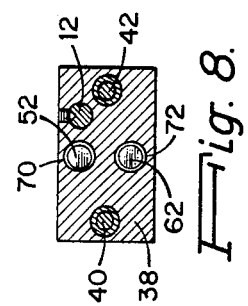
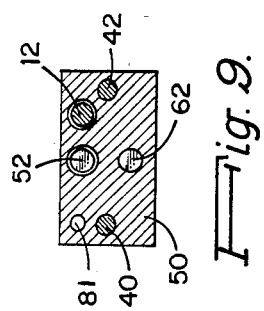
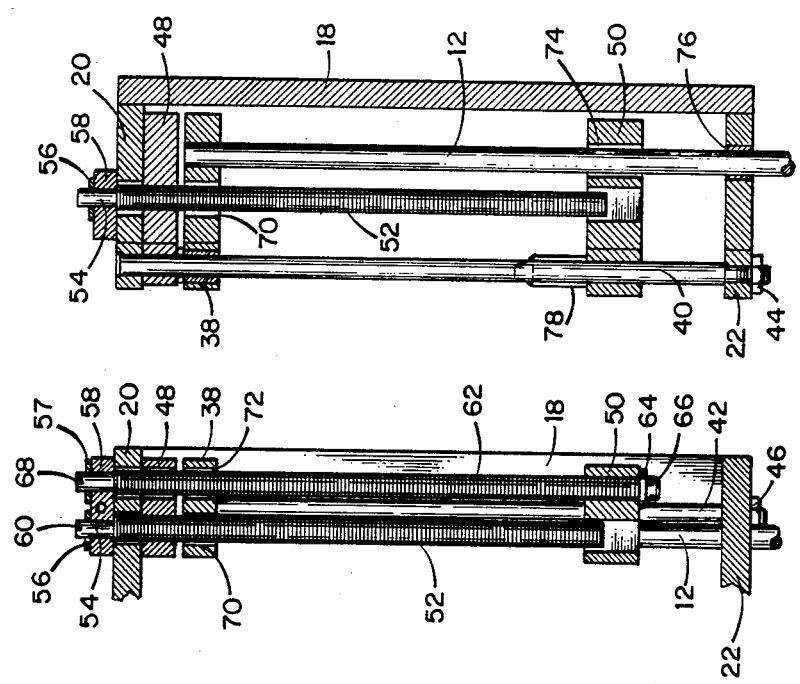

4,583,629

AIR OPERATED PRESS GUARD

BACKGROUND OF THE INVENTION

Devices for preventing injury to the hands of operators of punch presses, drop hammer and other machines of similar nature in which work pieces must be manually positioned before the machine is operated, are old and well known in the art. In general they include means which prevent machine operation when the operator's hand or hands are within a certain area adjacent the potentially dangerous movable machine element. The controls may be mechanical, electrical, photo-electric or otherwise.

SUMMARY OF THE PRESENT INVENTION

The present invention is used with presses in which the work pieces must be positioned by hand under the downwardly movable element. In such presses, the operation may be initiated by actuation of a valve under the control of the operator's hand or foot. It is essential that both hands be out of the way before the press element descends.

In the present construction, there is a vertically movable probe which must descend to a position adjacent the work piece before the press can function. If descent of the probe is blocked by the operator's hand, the press cannot operate. In a preferred construction movement of the probe and the press ram are controlled by a compressed air system including automatically shiftable valves to provide sequential operation of the probe and ram.

BRIEF DESCRIPTION OF THE DRAWINGS

FIG. 1 shows the probe mechanism mounted in operative position on a typical press.

FIG. 2 is an enlarged side elevation of the probe mechanism at rest position.

FIG. 3 is a front elevation of FIG. 2.

FIG. 4 is a plan view of FIGS. 2 and 3.

FIG. 5 is a vertical section taken on the line 5—5 of FIG. 4.

FIG. 6 is a vertical section taken on the line 6—6 of FIG. 4.

FIG. 7 is a horizontal section taken on the line 7—7 of FIG. 3.

FIG. 8 is a horizontal section taken on the line 8—8 of FIG. 3.

FIG. 9 is a horizontal section taken on the line 9—9 of FIG. 3.

FIG. 10 is a side elevation similar to FIG. 2 but with the probe in fully extended downward position.

DESCRIPTION OF A PREFERRED EMBODIMENT

Referring first to FIG. 1 the invention is shown therein in its general relation to a press. The safety probe mechanism, suitably encased, is indicated at 2. It is attached in any convenient manner to the side of press 4. Press 4 is representative of any press having a downwardly movable element such as a punch 6 for engaging a work piece 8 which has been positioned by hand on a work support 10.

Extending downward from probe unit 2 is a probe rod 12 having at its lower end an adjustable probe 14. This probe in a preferred form may carry a horizontal ring 16 which surrounds the punch 6.

With the work piece 8 properly positioned the operator then starts operation of the machine by actuation of a control valve usually foot operated. However, before the punch can function, the probe rod 12 and attached probe 14 must first move down to the dotted line position in FIG. 1 at which the ring is engaging or is very close to the work piece 8 and its supporting surface. Should any part of the operator's hand be beneath ring 16 thereby limiting the downward movement of rod 12, the punch 6 cannot operate. If the operator's hands are safely away, the probe will descend the full distance to establish air circuits permitting the punch to operate. Upon release of the control valve by the operator following completion of the punch operation, the punch and probe both ascend to stop in the at rest position shown in FIGS. 1, 2 and 3.

A detailed explanation of the construction of the safety probe unit will now be given by reference to FIGS. 2 to 10. In FIGS. 2, 3 and 4 the probe unit 2 is shown uncovered in rest position. A strong vertical panel 18 attached to press 4 carries rigid upper and lower horizontal plates 20 and 22. A double acting air cylinder 24 is pivotally mounted on plate 22. Piston 26 is pivotally connected at 28 to arm 30 mounted for rotation on fixed pivot 32. A tension spring 34 connected to plate 22 and the end of arm 30 constantly urges arm 30 counterclockwise as viewed in FIG. 2. The right hand end of arm 30 carries a roller 36 in free engagement with the underside of a rectangular block 38 hereinafter referred to as a probe block.

Still referring to FIGS. 2, 3 and 4 and further aided by FIGS. 5 and 6, it will be noted that plate 20 and 22 have extending therebetween a pair of parallel guide rods 40 and 42 each secured to plate 22 by nuts 44 and 46 and having their upper ends snugly fitting in aligned openings in plate 20. The guide rods act as means for guiding the vertical movement of three elements, the probe block 38 previously referred to, a top stop block 48 and a bottom stop block 50.

Top stop block 48 is held in vertically adjustable position by a threaded rod 52. Rod 52 passing freely through plate 20 has its upper end 54 of reduced diameter rotatably supported by washer and pin assembly 56 on the top of supporting block 58. Rod 52 is slotted at its end at 60 to accept a screwdriver whereby upon rotation block 48 may be vertically adjusted.

Similarly, bottom stop block 50 is carried by threaded rod 62 the upper end of which is rotatably carried by washer and pin assembly 57 resting on supporting block 58. Rod 62 passes freely through plate 20, stop block 48 and probe block 38. Bottom stop block 50 is shown in its lowermost position, resting on washer 64 attached to the end of rod 62 by screw 66. Rotation of rod 62 by screwdriver in slot 68 enables bottom stop block 50 to be vertically adjusted.

The probe block 38 previously referred to, is freely movable vertically on guide rods 40 and 42 and without interference from threaded rods 52 and 62 which pass through clearance holes 70 and 72 (see FIGS. 5, 6 and 8).

Probe block 38 supported by the roller 36 on the end of arm 30 has depending therefrom probe rod 12 which passes through clearance hole 74 in bottom stop block 50 and through bushing 76 in plate 22. From the foregoing it will be understood that when arm 30 is rotated clockwise from its position in FIGS. 2 and 3 to the down position shown in FIG. 10, the probe block 38 will gravitationally descend, all the while resting on roller 36.

Probe rod 12 has probe 14 adjustably connected thereto (see FIGS. 2 and 3) whereby the hand engaging part thereof may be most effectively positioned with respect to the work piece and the operator's hands.

Referring to FIGS. 2, 3 and 10, it will be noted that the bottom stop block 50 has fixedly mounted thereon an air pilot bleed 78 which is rubber tipped as at 80. An air passage 81 extends therethrough. When this passage is closed by engagement of the descending probe block 38 with rubber tip 80 as shown in FIG. 10, the press can go into operation.

OPERATION OF PRESS GUARD

The mechanism just described operates in conjunction with the press in the following manner.

Referring again to FIGS. 2 and 10 the press cylinder that operates the press is shown schematically at 82. This cylinder and cylinder 24 are both compressed air operated and connected by appropriate air valves and air lines which cause the required sequential operation of the guard and press.

A four way probe valve is shown at 84 and a four way press cylinder valve at 86 in FIGS. 2 and 10. These valves are connected by air lines to their respective cylinders in conventional manner. In FIGS. 2 and 10, the air lines are indicated by the numerals 88, 90, 92, 94, 96 and 98. The solid lines indicate that those lines are under pressure. The dotted lines indicate that those lines are exhausting to atmosphere. The object of this arrangement is to preclude operation of the press cylinder 82 until the air pilot bleed 78 has been closed by engagement of descending probe block 38 with rubber tip 80 as shown in FIG. 10.

This closure of bleed 78 as previously explained cannot occur until the operator's hands are out of the way of descending probe 14, 16.

The parts as shown in FIG. 2 are at rest. After the operator has manually positioned the work piece on base 10 as suggested in FIG. 1, he then opens a control valve 106 (usually foot operated) which admits compressed air to the air pilot 102 of the four way valve 84 causing valve 84 to shift to the position shown in FIG. 10. Air under pressure flowing from the air supply 108 through ports A and B into line 88 then enters the top of air cylinder 24 retracting piston 26 and starting the descent of arm 30 and probe block 38. Compressed air supply from line 88 also flows through limit valve 100 and line 92 to exhaust through the open air pilot bleed 78.

When the probe cylinder 24 becomes fully retracted as in FIG. 10 the probe block 38 engages and closes the rubber tipped air pilot bleed 78 creating pressure in line 92 and causing the limit valve 100 to shift to produce pressure at limit valve port M.

The pressure from port M feeding through line 94 causes the press cylinder valve 86 to shift from the position of FIG. 2 to the position shown in FIG. 10. Compressed air entering through ports F and J and line 96 causes the press cylinder 82 to extend downward and perform its work on the work piece 8. It will remain extended for as long as the operator keeps the control valve 106 open.

When the operator releases the control valve 106, air pressure on the probe valve air pilot 102 exhausts and the probe valve 84 shifts back from the position in FIG. 10 to its at rest position as in FIG. 2. Pressure from line 108 then flows through ports A and D and line 90 to extend piston 26 while cylinder 24 exhausts through line 88 and ports B and C to atmosphere. Limit valve 100 also exhausts through port L to eliminate pressure in lines 92 and 94, causing the press cylinder valve 86 to shift back from its position in FIG. 10 to the position shown in FIG. 2. Compressed air then flows through ports F and G and line 98 to retract the piston in press cylinder 82 while exhausting through line 96 and ports J and K. The extension of piston 26 swings arm 30 counterclockwise and raises the probe block 38 from the position of FIG. 10 to that of FIG. 2. This completes one machine cycle with all parts coming to rest.

The four way valves 84 and 86 and the limit valve 100 are off the shelf items. The source of compressed air to operate the system is likewise conventional.

The extent of the vertical adjustment of probe block 38 and the attached probe rod 12 to meet the condition of the position of the work piece 8 and the operator's hands is readily controlled. The position of top stop block 48 on threaded rod 52 limits upward movement of probe block 38. The position of bottom stop block 50 on threaded rod 62 controls the position of bleed 78 which limits the downward movement of probe block 38 and the attached probe rod 12 and probe 14. By these means the up and down movement of the probe can be set to provide adequate clearance when up for manual positioning of the work piece and when down blocking operation of the press unless the operator's hands are out of the way.

It will be understood that other equivalent means could be used for guiding the movement of the top stop block, the probe block and the bottom stop block and that the shape of these blocks could be modified. Also the length and positioning of the air pilot bleed 78 can be varied so long as the air passage can be closed by the descending probe block.

It is intended to cover all changes and modifications of the example of the invention herein chosen for purposes of the disclosure which do not constitute departures from the spirit and scope of the invention.

I claim:

1. The combination of an air operated press and an air controlled press guard,
    a press guard supporting structure mounted on said press,
    a vertically movable probe carried by said structure,
    means comprising an air cylinder and piston for moving said probe down and up,
    means comprising an air cylinder and piston for operating said press,
    means comprising interconnected air lines and associated air pressure operated valves connected to said both said air cylinders whereby said press can be operated only when said probe is at the end of its downward movement.

2. A press guard for use with a press comprising,
    a supporting structure mounted on said press,
    a vertically movable probe carried by said structure,
    said probe including engaging means attached to its lower end,
    air actuated means for permitting said probe to gravitationally descend,
    air actuated means for moving said press element down and up,
    air actuated valves for controlling the movement of said probe and said press element,
    an air exhaust port fixed with respect to said press, means attached to said probe for closing said port upon full downward movement of said probe and, means operative upon the closing of said port for operating said press.

3. In an operator controlled air actuated punch press, means for attachment to said press for protecting the hands of said press operator, said means comprising at least one vertical guide rod, a probe block mounted for vertical movement on said rod, a vertically adjustable top stop block on said rod for limiting upward movement of said probe block, a vertically adjustable bottom stop block on said rod, a tubular element providing an air passage mounted on said bottom stop block in vertical alignment with part of said probe block whereby downward movement of said probe block will be limited by engagement with said element and air flow through said element will be shut off, a probe rod and associated probe depending from said probe block, said probe so positioned with respect to the punch of said press that the closing of the air passage in said element by said probe block will be prevented if the hand of the said operator is engaged by said probe when descending, and compressed air operated means for operating said press, said means operable only when said air passage has been closed by said probe block.

4. An operator controlled punch press having its punch driven by an air cylinder and its associated piston, means for protecting the hands of said operator from downward movement of said punch, said means comprising a vertically movable probe carried by a probe block, an air tube fixed in relation to said press and having an open end located where it may be closed by means connected to said probe, a compressed air system comprised of valves and piping whereby in the rest position of said press air will not be flowing through said air tube and said press air cylinder will be inoperative, operator controlled means for causing flow of air through said air tube and for causing descent of said probe, and valve means operable only after said air tube has been closed by said means connected to said probe to cause increase in pressure in said air tube and thereby to cause operation of said press cylinder.

5. A hand guard for use with a punch press, said guard comprising a unit attachable to a press, said unit comprising upper and lower supports, at least one vertical guide rod carried by said supports, a probe block mounted for vertical movement on said guide rod, a probe depending from said probe block and so located as to be intercepted during downward movement by an operator's hand if in the vicinity of the punch of said press, an air cylinder and intermediate means for controlling the downward and upward movement of said probe block and probe, an air bleed carried by said unit and closable upon descent and engagement therewith of said probe block, and compressed air actuated means operable upon the closing of said bleed to cause operation of said press.

6. The construction set forth in claim 5 and means for vertically adjusting the position of said bleed thereby to control the extent of the downward movement of said probe block and associated probe before operation of said press.

7. The construction set forth in claim 5, said intermediate means comprising a pivoted lever arm moved by said air cylinder, said probe block being supported by said lever arm and movable downwardly upon downward rotation of said arm far enough to engage said bleed.

* * * * *